United States Patent [19]

Raycher

[11] 4,117,298

[45] Sep. 26, 1978

[54] CONTROL FOR WELDING DEVICE

[75] Inventor: Robert J. Raycher, Brunswick, Ohio

[73] Assignee: Tru-Fit Products Corporation, Medina, Ohio

[21] Appl. No.: 673,428

[22] Filed: Apr. 5, 1976

[51] Int. Cl.$^2$ .............................................. B23K 9/20
[52] U.S. Cl. .................................. 219/98; 307/252 M
[58] Field of Search .......................... 219/98, 99, 135; 307/305, 252 M

[56] References Cited

U.S. PATENT DOCUMENTS

| | | | |
|---|---|---|---|
| 3,162,747 | 12/1964 | Netzsch | 219/98 |
| 3,346,715 | 10/1967 | Jenkins | 219/98 |
| 3,414,700 | 12/1968 | Glorioso | 219/98 |
| 3,519,787 | 7/1970 | Kroy | 219/98 |
| 3,564,294 | 2/1971 | Balchin | 307/305 |
| 3,932,724 | 1/1976 | Raycher | 219/98 |
| 3,999,034 | 12/1976 | Barhorst | 219/135 |

Primary Examiner—J. V. Truhe
Assistant Examiner—Clifford C. Shaw

Attorney, Agent, or Firm—Woodling, Krost, Granger & Rust

[57] ABSTRACT

An electronic control unit is disclosed for a stud welding device having a movable electrode mounted on a solenoid armature, for moving the electrode away from the workpiece. The control includes a timing circuit providing a plurality of timer outputs in accordance with the preselected time intervals. A pilot arc circuit and an electrode movement circuit connected to the solenoid are activated by a timer output for establishing a pilot arc between the electrode and the workpiece and for moving the electrode from the workpiece. A welding power circuit is activated by another one of the plurality of timer outputs to establish welding current between the electrode and the workpiece. The electrode movement circuit is deactivated by another one of the plurality of timer outputs to enable the electrode to contact the workpiece by the urging of a spring. Means are provided for terminating the welding current. The control is suitable for use in a direct current welding power circuit.

13 Claims, 1 Drawing Figure

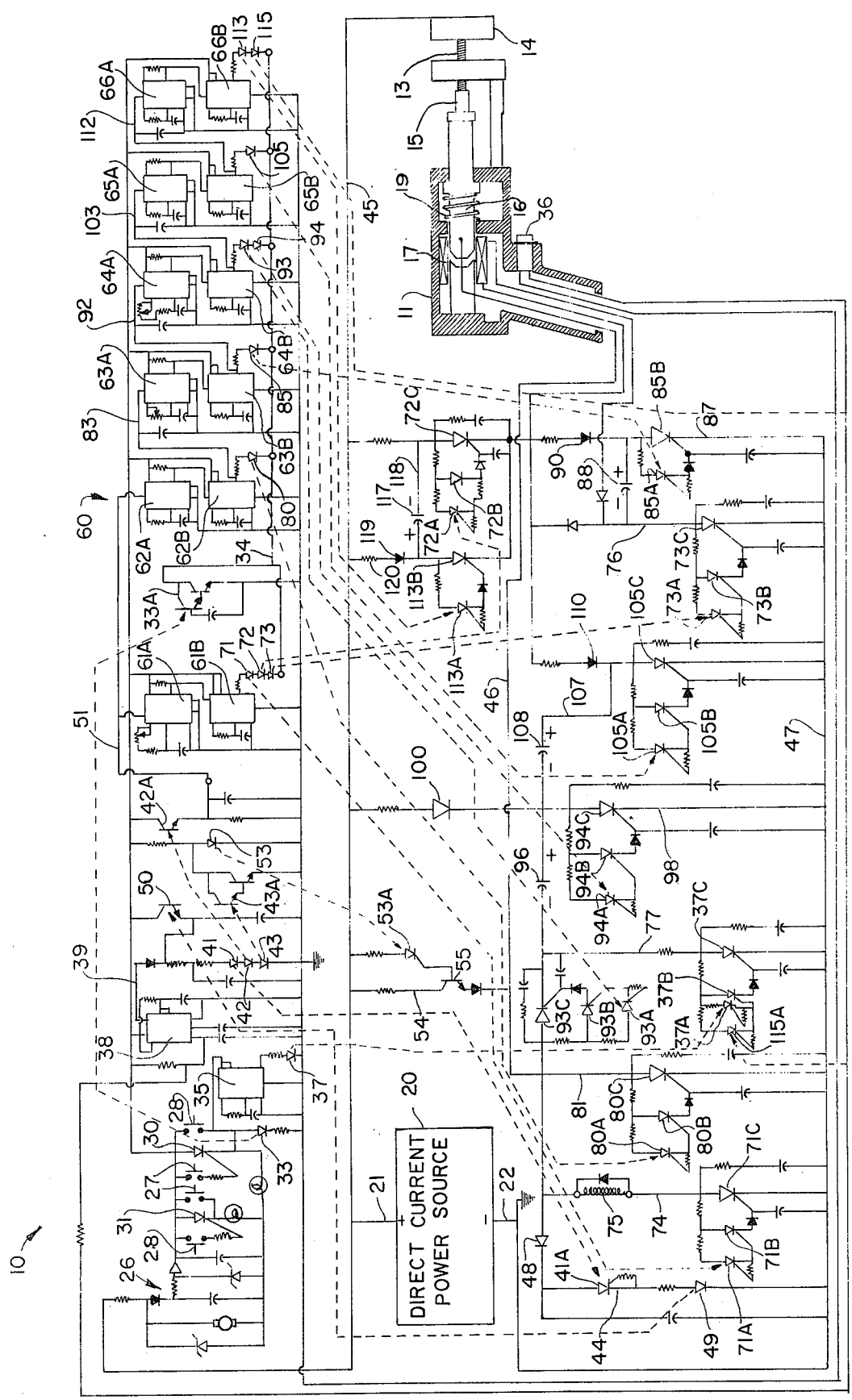

CONTROL FOR WELDING DEVICE

BACKGROUND OF THE INVENTION

1. Field of the Invention

This invention relates to electric heating and more particularly to metal heating by electric arc suitable for use with welding devices.

2. Description of the Prior Art

The prior art has provided a variety of welding apparatuses and control units for welding an electrode or a stud to a workpiece. The welding of a stud to a workpiece is frequently performed on a construction location requiring the welding apparatus to be portable and compact to transport. Capacitive discharge stud welding devices have incorporated solid state circuitry but heretofore the direct current welding controls have relied on a transformer-rectifier combination. The direct current output of these transformer-rectifier combinations was controlled on the secondary side of the transformer by phase controlling a D.C. output in the order of 1,200 amperes at 50 volts. In addition, a short circuit may exist between the stud and the workpiece after the welding operation depending upon whether a cold or hot plunge welding operation is used by the stud welding device. The only solid state component presently available having the capability of controlling the current on the secondary side of the transformer-rectifier combination is a thyristor. A thyristor once conducting will continue to conduct until the thyristor current is terminated by some other component in the circuit. Heretofore, thyristor circuits capable of commutating large current levels were found in motor power circuits and generally were not portable units. The prior art has failed to develop a stud welding apparatus having a thyristor controlled secondary circuit which is portable.

Therefore, an object of this invention is to provide a control for a welding device incorporating solid state circuitry to control the output current of a welding device.

Another object of this invention is to provide a control for a welding device incorporating thyristor control of the welding current with commutation means for terminating conduction of the thyristor.

Another object of this invention is to provide a control for a welding device incorporating a timer circuit for providing a plurality of timer outputs in accordance with preselected time intervals for controlling a welding sequence.

Another object of this invention is to provide a control for a welding device including a novel shunt leakage circuit for preventing a substantial electric potential difference from developing between the electrode and the workpiece.

Another object of this invention is to provide a control for a welding device incorporating a photo-electric of OPTO isolator device for connecting the low power control circuits with the high power control circuit.

Another object of this invention is to provide a control for a welding device incorporating a novel charging circuit for charging a commutating capacitor for commutating the welding current.

Another object of this invention is to provide a control for a welding device incorporating a novel commutation circuit enabling the use of an electrolytic commutating capacitor.

Another object of this invention is to provide a control for a welding device incorporating a two stage commutation circuit for commutating the welding current.

Another object of this invention is to provide a control for a welding device which results in an accurate and an adjustable control of the sequence of a welding operation.

Another object of this invention is to provide a control for a welding device which is applicable to existing said welding devices.

SUMMARY OF THE INVENTION

The invention may be incorporated into a control for a welding device, comprising in combination, a direct current power source having a first and a second terminal, a welding circuit including first connection means connecting said first terminal of said power source to the electrode and second connection means connecting said second terminal of said power source to the workpiece with welding switch means interposed in one of said first and second connecting means for controlling welding current in said welding circuit, a commutating circuit comprising commutating capacitor means and commutating switch means connected to said welding switch means for commutating said welding switch means upon conduction of said commutating switch means, a charging circuit including charging switch means connecting said commutating capacitor means between said first and second terminals of said power source, means for initiating conduction of said charging switch means to charge said commutating capacitor means with said direct current power source, means for initiating conduction of said welding switch means to establish welding current between the electrode and the workpiece, and means for initiating conduction of said commutating switch means for discharging said commutating capacitor means to terminate conduction of said welding switch means.

Other objects and a fuller understanding of the invention may be had by referring to the following description and claims, taken in conjunction with the accompanying drawings.

BRIEF DESCRIPTION OF THE DRAWING

The drawing illustrates a schematic diagram of a control circuit connected to a welding device shown as a stud welding gun.

DESCRIPTION OF THE PREFERRED EMBODIMENT

The preferred embodiment of the invention is illustrated in the drawing showing an electronic control 10 for a welding device 11 shown as a hand held stud welding gun for welding an electrode or a stud 13 to a workpiece 14. The welding gun 11 includes electrode moving means for moving the electrode 13 relative to the workpiece 14 shown as a chuck 15 mounted to a solenoid armature 16 for movement within a solenoid coil 17. Current flow in coil 17 moves the electrode 13 in a first direction away from the workpiece 14 against the urging of urging means shown as a spring 19. Termination of current flow in coil 17 enables spring 19 to move the electrode 13 in a second direction toward the workpiece 14. The electronic control 10 is connected to the welding device 11 by electrical cables as shown. Stud welding gun shown in U.S. Pat. No. 3,723,698 is suitable for use with the control 11 and are hereby incorporated by reference herein.

In general, the upper half of the control 10 generates low power control signals for activating the high power current control components on the lower half of the control 10 to operate the welding device 11. Each dashed line indicates an optical connection between a photoemitting component and a photosensitive component. The photoemitting and photosensitive components are generally contained in a single container and are commonly referred to as an IPTO isolator.

The control 10 includes a power source 20 having a first terminal 21 and a second terminal 22 respectively shown as positive and negative terminals of a direct current power source. The power source 20 is connected to a power supply 26 which furnishes power to the low power section of the control 10. The power supply 26 includes a first and a second pair of switches 27 and 28 connected for controlling thyristors 30 and 31. A photoemitting device comprising a photodiode or a light emitting diode (LED) 33 is optically coupled to a photosensitive device comprising a Darlington phototransistor 33A. Placing the first switch pair 27 in the contacting position energized thyristor 30 to provide a light output from diode 33 to transistor 33A which connects the output line 34 to the ground terminal of the power circuit 20. Non-conduction of phototransistor 33A disables the outputs common to line 34 during the initial warm-up stage of the power supply 26 to eliminate accidental triggering of any of the current control components in the lower portion of the control 10. Switch 27 also commutates thyristor 31 to a non-conducting state, and energizes a timer circuit 35 to provide light output from a photodiode 37 which will be hereinafter considered. Placing the second switch pair 28 in the contacting state commutates thyristor 30 into a non-conduction state thereby terminating emission of diode 33.

A welding power switch 36 located on the welding device 11 is connected to a timer circuit 38 which produces a positive output pulse of approximately (3.0) seconds on output line 39 upon closing switch 36. The timer circuit 38 may be an integrated circuit such as a National Semiconductor LM 555 for example. The output pulse on line 39 energizes three photodiodes 41, 42 and 43 which are respectively coupled to three photosensitive devices 41A, 42A and 43A. The first diode 41 is optically coupled to a photothyristor 41A connected in a contact sensing circuit 44 comprising a positive bus bar 45 connected to the workpiece 14, an electrode bus bar 46 connected to electrode 13, diode 48, and photodiode 49. Diode 49 is optically coupled to a phototransistor 50 for shorting photodiodes 41-43. If the electrode 13 is electrically connected to the workpiece 14 when photothyristor 41A is energized then diode 49 causes transistor 50 to short diodes 41-43 after the initial light output until the electrode 13 is no longer in electrical contact with the workpiece 14. This insures that the welding process continues in a sequence irrespective of multiple signals applied by the switch 36. The second photodiode 42 is optically coupled to phototransistor 42A for providing an output pulse on line 51 to trigger timing devices as hereinafter described. The third photodiode 43 is optically coupled to a Darlington phototransistor 43A which terminates emission of a photodiode 53 upon conduction of transistor 43A. The photodiode 53 is optically coupled to a photothyristor 53A which controls the base current of a transistor 55 connected in a shunt leakage circuit 54. Transistor 54 provides a low impedance shunt between the positive bus 45 and the electrode bus 46 to eliminate voltage build-up between the electrode 13 and the workpiece 14 during non-use. A leakage current of several amperes at a power source voltage of 50 volts through the main welding current thyristor may be encountered absent the shunt leakage circuit 54.

The output pulse on line 51 triggers a timing device 60 including a first timer circuit pair 61A and 61B and a second timer circuit pair 62A and 62B. Each timer circuit is shown as an integrated circuit and may be a National Semiconductor LM 3905 timing circuit for example. The timing device 60 includes third through sixth timing pairs 63A-66A and 63B-66B. The output of each timer unit 61A-66A is respectively connected to the input of each of the timer unit 61B-66B. The output of the timer pair 61 and more particularly the output of timer 61B is connected to photodiodes 71-73. Photodiode 71 is optically connected for activating a photothyristor 71A which forms a part of a pilot arc circuit 74. Conduction of thyristor 71A causes conduction of thyristors 71B and 71C to establish current flow in the positive bus 45, between the workpiece 14 and the electrode 13, in the electrode bus 46 and through the pilot arc circuit 74. A series inductor 75 limits the current flow in the pilot arc circuit 74. The photodiode 72 is optically coupled to a photothyristor 72A which enables conduction of thyristors 72B and 72C in an electrode movement circuit 76. Photodiode 73 is optically coupled to enable conduction of thyristors 73A, 73B and 73C. Activation of thyristors 72C and 73C enables conduction of current in the electrode movement circuit 76 between the positive bus 45 through coil 17 to a negative bus or ground bus 47. Initiating current through the coil 17 causes a retraction of the electrode 13 from the workpiece 14 against the urging of the spring 19 concomitantly with the pilot arc circuit 74 initiating a pilot arc between the electrode 13 and the workpiece 14. Although the output of timer pair 61 is used for activating both the pilot arc circuit 74 and the electrode movement circuit 76 it is understood that these circuits may be activated separately in time from one another depending on the power source used, the relationship between the electrode and the workpiece.

As previously described the closing of switch pair 27 activates thyristor 30 which energizes timer 35. Timer 35 which may also be a National Semiconductor LM 3905 activates photodiode 37 for approximately 2 milliseconds. Photodiode 37 is optically coupled to a photothyristor 37A for causing conduction of thyristors 37A, 37B and 37C. Thyristors 37A-37C form a portion of a charging circuit 77 for charging a commutating capacitor 96. Upon conduction of thyristor 37C current flows from the positive bus 45 through diode 100 to charge capacitor 96 as shown to the approximate potential of the power source 20. After capacitor 96 is charged, thysistors 37A-37C terminate conduction. The charging circuit 77 is immediately activated upon application of power to the control 10 by switches 27 to ensure that capacitor 96 is fully charged prior to the welding operation. Accordingly, if the power source voltage is subsequently reduced due to the welding current, there will be sufficient charge stored in capacitor 96 to enable commutation of thyristor 80C as will be hereinafter explained.

The output of phototransistor 42A is coupled by line 51 to the second timer circuit pair 62A and 62B. The timer pair 62A and 62B is adjusted to provide an output to photodiode 80 approximately 180 milliseconds after switch 36 is closed and approximately 175 milliseconds after the output from timer 61B to photodiodes 71-73. Photodiode 80 is optically coupled to a photothyristor 80A connected in a welding power circuit 81. The conduction of thyristor 80A causes conduction of thyristors 80B and 80C enabling welding current to flow between the electrode 13 and the workpiece 14. The welding current flow through thyristor 80C may exceed 2,000 amperes. Accordingly, the shown configuration of three thyristors 80A, 80B and 80C is required to trigger a thyristor 80C having such a high current capacity. Thyristor 80C is also the source of the large leakage current between the electrode 13 and the workpiece 14 during non-conduction of thyristor 80C necessitating the incorporation of the shunt leakage circuit 54. Conduction of thyristor 80C provides a short circuit across thyristors 71A-71C thereby commutating thyristors 71A-71C to a nonconducting state.

The relationship in time between the output from timer 35 and the output from timer 62B provides a minimum time of 180 milliseconds to charge capacitor 96 prior to conduction of thyristor 80C in the event that switches 27 and 36 are simultaneously closed. In general, the only time switches 27 and 36 will be simultaneously closed in the case of accident or misuse of the control 10. Even under these conditions, capacitor 96 has sufficient time to charge prior to conduction of thyristor 80C to enable commutation of thyristor 80C as will be hereinafter explained. The relationship in time between the output from timer 61B and output of timer 62B affords a 175 millisecond time interval to establish the pilot arc and to raise the electrode 13 from the workpiece prior to initiation of the welding current.

The output of timer 62B is connected through a line 83 for triggering the third timer circuit pair 63A and 63B. Output of timer circuit 63 for activating photodiode 85 may be adjusted to occur from 16 milliseconds to 2,000 milliseconds after the signal on line 83. Photodiode 85 is optically coupled to thyristor 85A to activate thyristor 85B which forms a part of a commutation circuit 87 including capacitor 88. Capacitor 88 charges as shown through diode 90 during conduction of thyristor 73C. Conduction of thyristor 85B reverse biases thyristors 73A, 73B and 73C by capacitor 88 thereby commutating thryistors 73A, 73B and 73C into a nonconducting state. Termination of conduction of thyristor 73C terminates current through coil 17 allowing spring 19 to plunge electrode 13 toward the workpiece 14. Current remains flowing through thyristors 72C and 85B between the positive and negative bus bars 45 and 47. The output of timer 63B is connected through a line 92 for triggering the fourth timing circuit pair 64A and 64B.

The output of timer 64B to photodiodes 93 and 94 occurs approximately 35 milliseconds after the output on line 92. Photodiodes 93 and 94 are optically connected to photothyristors 93A and 94A which in combination with the commutating capacitor 96 form a part of a commutation circuit 98. Conduction of thyristor 93A causes conduction of thyristors 93B and 93C whereas conduction of thyristor 94A causes conduction of thyristors 94B and 94C thereby connecting the charged commutating capacitor 96 across thyristor 80A-80C. Capacitor 96 was charged to the approximated open circuit voltage of the power source 20 by timer 35 and thyristors 37A-37C prior to loading of the power source 20 during the flow of welding current through thyristor 80C. In order to commutate the large current flowing through thyristor 80C (typically 2,000 amperes at 50 volts) the commutating capacitor 96 must have a value of approximately 28,000 microfarads. In order to reduce the physical size to make the control 10 portable the invention incorporates an electrolytic capacitor for commutating thyristor 80C. An electrolytic capacitor in some cases may be one-twentieth the size of a comparable non-electrolytic capacitor. However, novel commutation circuit 98 and the charging circuit 77 must prevent the electrolytic capacitor 96 from being charged with the reverse polarity of voltage. Capacitor 96 discharges through thyristors 94C and 93C thereby commutating thyristor 80C into a non-conducting state. Thyristor 93C terminates conduction after thyristor 80C ceases to conduct by current starvation since capacitor 96 is clamped to the positive bus 45 by diode 100. The welding circuit 81 and commutation circuit 98 have an insufficient amount of inductance to cause voltage reversal of capacitor 96. Current continues to flow through diode 100 and thyristor 94C after thyristor 93C has ceased to conduct current.

The output of timer 64B is also connected through a line 103 to trigger timer pair 65A and 65B. The output of timer 65B occurs approximately 150 milliseconds after the output on line 103 to ensure sufficient time to commutate thyristors 80 and 93. The output of timer 65B activates photodiode 105 which is optically coupled to a photothyristor 105A which forms a part of a second commutation circuit 107. Conduction of thyristor 105A causes conduction of thyristors 105B and 105C to enable discharge of capacitor 108 across thyristor 94C to commutate thyristor 94C in a nonconducting state. Capacitor 108 is charged as shown through diode 110 during conduction of thyristor 94C. Current continues to flow through thyristor 72C, diode 90 and thyristor 85B and through diode 110 and thyristor 105C.

The output of timer 65B is connected through line 112 to provide input to timing circuit pair 66A and 66B. An output of timer 66B activates photodiodes 113 and 115 approximately 80 milliseconds after the signal on line 112. Photodiode 113 is optically coupled through photothyristor 113A to trigger thyristor 113A and 113B which forms a part of a commutation circuit 118 with capacitor 117. Capacitor 117 charges through diode 119 during conduction of thyristors 72C. Conduction of thyristor 113B applies the potential of capacitor 117 across thyristor 72C to commutate thyristor 72C into a non-conducting state. After current ceases to flow in thyristor 72C, thyristors 85B and 105C also cease conduction. Conduction in thyristor 113B is terminated since the series resistance 120 limits the current through thyristor 113B below the holding current of thyristor 113B.

The photodiode 115 is optically coupled to photothyristor 115A for triggering thyristors 37B and 37C. These thyristors comprise a portion of the charging circuit 77 for charging the commutating capacitor 96 as previously described. Accordingly, capacitor 96 is charged upon firing thyristor 37C through diode 100 to the power source potential. After the capacitor 96 has been charged, thyristor 37C terminates conduction. The final activation of the charging circuit ensures that the capacitor 96 has a full charge prior to the next subsequent welding current flow.

The control 10 may be briefly described in the operating mode beginning with the closing of switch 27, which energizes the charging circuit 77. The electrode 13 is then brought into contact with the workpiece 14 and switch 36 is depressed thereby activating the contact sensing circuit 44, the shunt leakage circuit 54, and the timing device 60. The output from the first timer 61 activates the pilot arc circuit 74 and the electrode movement circuit 76 for establishing the pilot arc and withdrawing the electrode 13 from the workpiece 14. The output from the second timer 62 initiates welding current in the welding circuit 81. The output from the third timer 63 terminates current flow in the coil 17 enabling the spring 19 to plunge the electrode 13 toward the workpiece 14. The output of the fourth timer 64 activates commutation circuit 98 for terminating current flow in the welding circuit 81. Output from the fifth timer 65 energized commutation circuit 107 for commutating current flow in commutation circuit 98. The output of the sixth timer 66 terminates the remaining current flow in the electrode movement circuit 76 and in the second commutation circuit 107. The output of the sixth timer 66 also activates charging circuit 77 to ensure that the electrolytic commutating capacitor 96 has sufficient charge for commutating the next subsequent welding operation.

The invention has been set forth in a preferred form with a specific sequence and specific time duration between the sequence of operation of the control 10. It should be noted that all of the timing devices 61A–66A have changeable resistors for changing these time durations and that the specific times have been set forth only for teaching a specific welding condition. These specific sequence and values are not to be construed as a limitation on the instant invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A control for a welding device, comprising in combination: a direct current power source having a first and second terminal; a welding circuit including first connection means connecting said first terminal of said power source to the electrode and second connection means connecting said second terminal of said power source to the workpiece with welding switch means interposed in one of said first and second connection means for controlling welding current in said welding circuits; a commutating circuit comprising commutating capacitor means and commutating switch means connected to said welding switch means for commutating said welding switch means upon conduction of said commutating switch means; a charging circuit including charging switch means connecting said commutating capacitor means between said first and second terminals of said power source, means for initiating conduction of said charging switch means to charge said commutating capacitor means with said direct current power source; means for initiating conduction of said welding switch means to establish welding current between the electrode and the workpiece; means for initiating conduction of said commutating switch means for discharging said commutating capacitor means to terminate conduction of said welding switch means; and means responsive to the termination of conduction of said welding switch means effective to reactivate said charging circuit and charge said commutating capacitor means.

2. A control as set forth in claim 1, including a shunt leakage circuit to prevent the presence of a substantial electrical potential difference between the electrode and the workpiece;

and means for deactivating said shunt leakage circuit prior to activating said welding power circuit.

3. A control as set forth in claim 1, wherein said commutating capacitor means includes a first and a second terminal;

said commutating switch means includes a first and a second commutating switch respectively connected to said first and second terminals of said commutating capacitor means;

and means connecting said first and second commutating switches to opposite sides of said welding switch means.

4. A control as set forth in claim 1, wherein said welding power circuit includes welding switch means for controlling said welding circuit;

a commutating circuit including first and second commutating capacitor means and first and second commutating switch means;

means connecting said first commutating capacitor means in series with said first commutating switch means for commutating said welding switch means upon conduction of said first commutating switch means;

and means connecting said second commutating capacitor means in series with said second commutating switch means for commutating and first commutating switch means upon conduction of said second commutating switch means.

5. A control as set forth in claim 1, wherein said welding power circuit includes welding switch means for controlling said welding current;

and a commutating circuit including electrolytic capacitor means for commutating said welding switch means.

6. A control as set forth in claim 1, wherein said means for initiating includes a timing circuit providing a plurality of outputs at preselected timing intervals.

7. A control as set forth in claim 1, wherein said commutating switch means includes a first and a second commutating switch;

said commutating capacitor means includes a first and a second terminal;

and said commutating circuit includes said first and second commutating switches respectively connecting said first and second terminals of said commutating capacitor means across said welding switch means.

8. A control as set forth in claim 7, wherein said charging circuit includes said charging switch means connecting said first terminal of said commutating capacitor means to said first terminal of said direct current power source.

9. A control as set forth in claim 8, wherein said charging circuit includes diode means connecting said second terminal of said commutating capacitor means to said second terminal of said direct current power source.

10. A control as set forth in claim 1 and including timing circuit means and means for activating said timing circuit means, a contact sensing circuit in said timing circuit means for sensing electrical contact between the electrode and the workpiece, power switch means connected for activating said contact sensing circuit to provide a contact sensing circuit output upon the electrode contacting the workpiece, and means connecting said contact sensing circuit output for activating said timing circuit means.

11. A control as set forth in claim 1 and which includes a pilot arc circuit connecting the power source to the electrode and the workpiece and having a series inductance for limiting the current flow between the electrode and the workpiece.

12. A control as set forth in claim 1 and which includes an electrode moving means, an electrode control circuit for controlling the movement of said moving means and having first and second switch means respectively connecting the power source to said electrode moving means.

13. A control as set forth in claim 12 and wherein the means for activating said electrode movement circuit includes means for initiating conduction of said electrode movement switch means; an electrode commutation circuit connected for commutation of said electrode movement switch means upon conduction of said electrode commutating circuit; and means for deactivating said electrode movement circuit includes means for initiating conduction in said electrode commutation circuit.

* * * * *